United States Patent [19]

Lastofka et al.

[11] Patent Number: 4,656,337
[45] Date of Patent: Apr. 7, 1987

[54] TOASTER OVEN

[75] Inventors: Paul A. Lastofka, Aurora, Colo.; M. James Wondergem, West Bend, Wis.

[73] Assignee: Dart Industries Inc., Northbrook, Ill.

[21] Appl. No.: 791,411

[22] Filed: Oct. 30, 1985

[51] Int. Cl.[4] .......................... A47J 37/06; F24C 7/10
[52] U.S. Cl. .................................. 219/386; 312/312;
126/275 E; 126/275 R; 126/340; 219/391; 219/521
[58] Field of Search ............... 219/386, 385, 408, 413, 219/405, 391, 412, 411, 521; 126/19 M, 340, 275 E, 275 R; 99/449; 312/312

[56] References Cited

U.S. PATENT DOCUMENTS

| | | | |
|---|---|---|---|
| 762,401 | 6/1904 | Hall | 99/399 |
| 1,370,089 | 3/1921 | Chipperfield | 312/218 |
| 1,450,056 | 3/1923 | Yeager | 126/275 R |
| 1,456,474 | 5/1923 | Sussman | 126/19 M |
| 1,563,353 | 12/1925 | Forshee | 99/376 |
| 1,955,867 | 4/1934 | Wilkie et al. | 99/390 |
| 2,125,989 | 8/1938 | Burch . | |
| 2,658,985 | 11/1953 | Maxwell | 126/19 M |
| 2,764,081 | 9/1956 | Glasser . | |
| 3,086,511 | 4/1963 | Loch . | |
| 3,119,000 | 1/1964 | Loch et al. | 219/413 |
| 3,193,663 | 7/1965 | Budzich et al. . | |
| 3,500,815 | 3/1970 | Weese et al. . | |
| 3,507,267 | 4/1970 | Lafforgue . | |
| 3,684,860 | 8/1972 | Snyder . | |
| 3,693,538 | 9/1972 | Snyder . | |
| 3,789,748 | 2/1974 | Rappoport et al. . | |
| 3,824,915 | 7/1974 | Capucio . | |
| 3,859,903 | 1/1975 | Kipp . | |
| 4,065,658 | 12/1977 | Keim . | |
| 4,144,869 | 3/1979 | Oatley . | |

FOREIGN PATENT DOCUMENTS 58-117931  7/1983  Japan .................. 126/19 M Primary Examiner—E. A. Goldberg
Assistant Examiner—Teresa J. Walberg
Attorney, Agent, or Firm—Gregory J. Mancuso

[57] ABSTRACT

A toaster oven of variable volume, including a box-like structure having a top oven portion and a bottom oven portion in telescoping relationship, forming a cavity and a front opening, a pin carried by the top portion, offset from and manually rotatable about an axis, a slot carried by the bottom portion adapted to receive the pin to telescope the top portion and the bottom portion, a door carried by the bottom portion adapted to cover the oven opening in all telescoped positions of the top and bottom, and a system of lever arms connected between the door and the food support rack adapted to slide a portion of the rack through the front opening when the door is opened.

20 Claims, 17 Drawing Figures

TOASTER OVEN

BACKGROUND OF THE INVENTION

Conventional toaster ovens comprise box-like structures having fixed top, sides, and bottom, with a hinged door at the front. Because of the fixed relationship among the top, sides, and bottom, the exterior dimensions and the size of the oven cavity are fixed. In general, the exterior size of the oven is directly proportional to the size of the oven cavity. If an oven of large capacity is desired, an oven of relatively large exterior dimensions is required. As the number of household appliances in a home increases, and as living spaces become smaller, more compact household appliances are becoming necessary. The problem of limited space is especially prevalent with under-cabinet installations. Unfortunately, conventional toaster ovens of the smaller exterior dimensions suitable for modern living spaces have insufficient oven capacity to be used with relatively large food items.

What has been needed, but not shown or suggested by the prior art, is a toaster oven of variable spacial capacity.

SUMMARY OF THE INVENTION

The toaster oven of the present invention comprises a structure having variable exterior and interior dimensions. When a large oven capacity is desired, the toaster oven of this invention can be expanded to its full spacial capacity. When a large oven capacity is not necessary, or when the oven is being stored, the toaster oven of this invention can be folded to a relatively compact size significantly smaller than its expanded size.

The toaster oven of this invention comprises a box-like structure having a first oven portion and a second oven portion together forming a cooking chamber having a front opening. The first oven portion comprises a first endwall, first sidewalls, and a first rear wall. The second oven portion comprises a second endwall generally opposed to the first endwall, second sidewalls generally adjacent to the first sidewalls, and a second rear wall generally adjacent to the first rear wall. A heating element and a food support rack are carried within the cooking chamber by either the first oven portion or the second oven portion. The first oven portion and the second oven portion are movable with respect to one another to a first position in which the exterior dimensions of the toaster oven are relatively compact and the cooking chamber and oven front opening are relatively small, and to a second position in which the exterior dimensions of the toaster oven and the cooking chamber and oven front opening are larger than in the first position. Means are provided to selectively retain the toaster oven in the first position and in the second position. A door is carried by the toaster oven, pivotable to a closed position and to an open position. The door is adapted to cover the front opening of the toaster oven in both the first and second positions of the toaster oven.

In one embodiment of this invention, the first oven portion comprises a lower oven portion and the second oven portion comprises an upper oven portion which is adapted to telescopingly receive the lower oven portion. The upper oven portion carries a lever arm in a generally vertical plane rotatable about a horizontal axis, having a pin offset from and parallel to the axis. The lever arm has an axle on the axis which passes through the upper oven portion sidewalls and is affixed to a handle by which the lever arm can be rotated about the axis. The lower oven portion carries a wall forming a slot offset from the axis, adapted to receive the lever arm pin. Rotation of the handle causes the lever arm to rotate about the axis, and the pin to slide in the slot, to move the lower oven portion and the upper oven portion relative to one another between the first position and the second position. The friction between the pin and the wall forming the slot allows the oven to be selectively retained in the first position and the second position.

In another embodiment, the door of the oven of this invention is movable between an initial position corresponding to the first position of the oven, and a final position corresponding to the second position of the oven. In the door's initial position, the upper and lower edges of the door are generally adjacent to the top and bottom surfaces of the toaster oven, so that the overall height of the toaster oven is approximately the same as the overall height of the door. In the final position of the door, the upper edge of the door is generally adjacent to the upper edge of the front opening of the oven, and the lower edge of the door is generally adjacent to the lower edge of the front opening. In the final position of the door, and the second position of the oven, the oven front opening is approximately the same height as the door.

In one embodiment, the door is carried by the lower oven portion, and the door axis is horizontal. The door carries opposed outwardly projecting pins which are received by a first pair of slots in opposed front shoulders of the lower oven portion. The upper oven portion has a pair of front shoulders adjacent to the lower oven portion front shoulders. A connector rod is located on the side of each upper oven portion shoulder opposite the door, and rotationally receives the door pin in its lower end. The upper end of each connector rod forms a second slot which slidably receives a finger projecting from the upper oven shoulder. In the first oven position, the door pins are at the lowermost portion of the first pair of slots and the upper oven shoulder fingers are at the lowermost portion of the second pair of slots. In that position, the door is secured from vertical movement in its initial position, but can rotate to open and close. In the second oven position, the door pins are at the uppermost portion of the first pair of slots and the upper oven shoulder fingers are at the uppermost portion of the second pair of slots. In that position, the door is secured from vertical movement in its final position, but can rotate to open and close.

In aother embodiment, the upper edge of the door is carried by the upper oven portion and the lower edge of the door is carried by the lower oven portion. The door rotates about a vertical axis.

In yet another embodiment, a first rack arm is connected to the door and to a second rack arm. The second rack arm is adapted to slide along a horizontal track carried by the lower oven portion. The second rack arm carries a leg which is adapted to engage a notch in the food support tray. The two rack arms are connected such that as the door is opened the leg of the second rack arm engages the notch in the food support tray to pull the tray outward, to expose food supported thereon.

These and other various aspects of the invention will be found in the following detailed description of a particular embodiment and in the accompanying drawings.

DESCRIPTION OF THE PREFERRED EMBODIMENT

Figure 1:
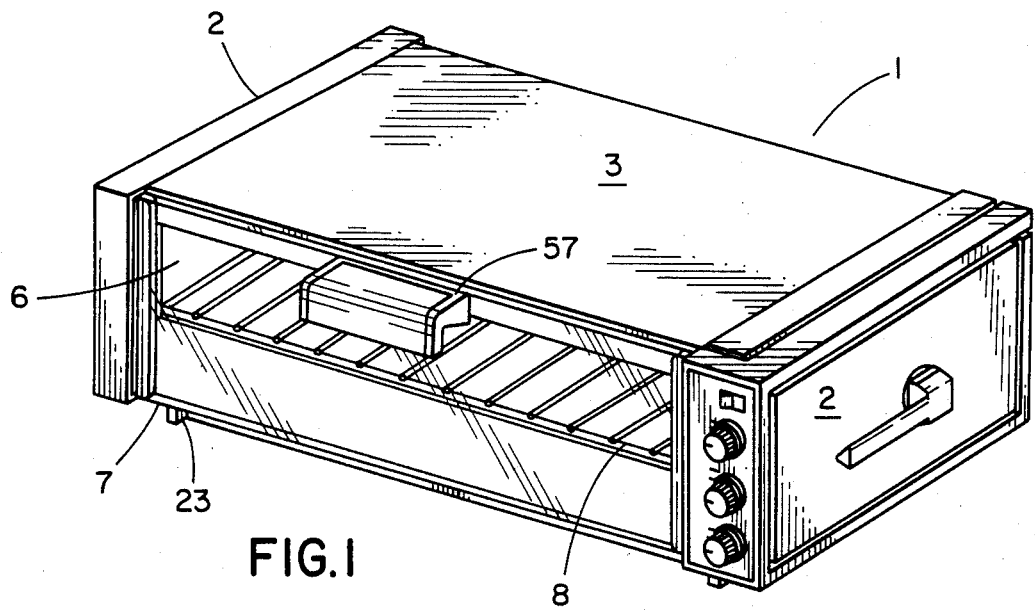
FIG. 1 is a front perspective view of the toaster oven of this invention.
Figure 2:
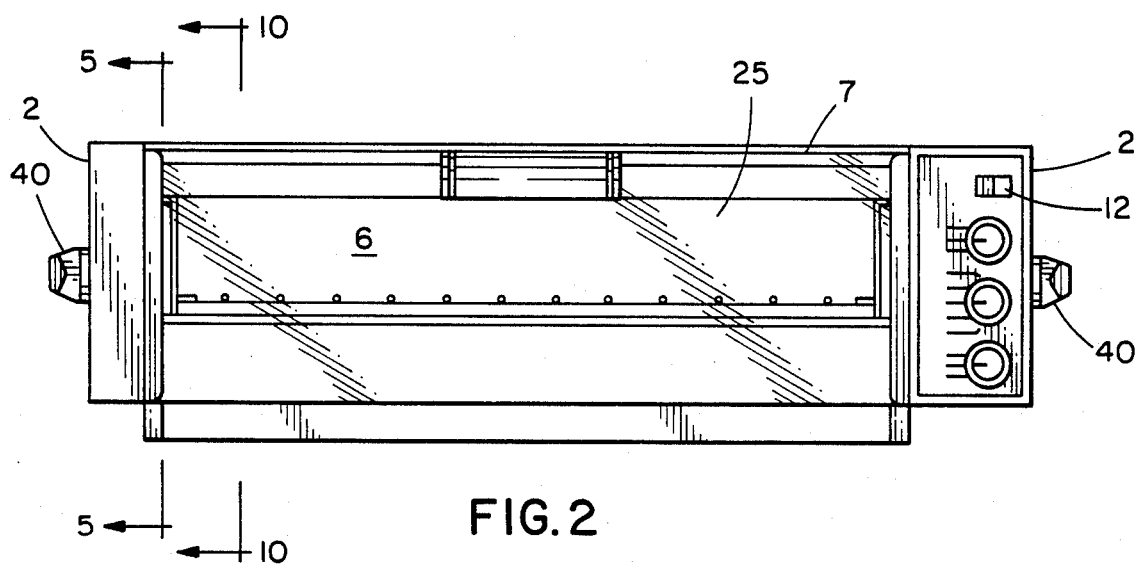
FIG. 2 is a front elevation view of the toaster oven of FIG. 1.
Figure 3:
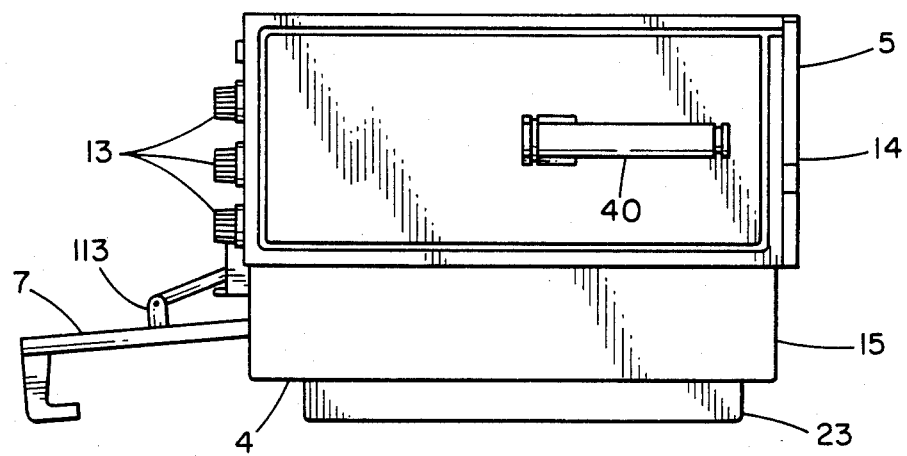
FIG. 3 is a side elevation of the toaster oven of FIG. 1, showing the oven in its expanded position with the door open.

Referring to FIGS. 1-4, the toaster oven of this invention comprises box-like structure 1 having generally parallel opposite sides 2, top endwall 3 generally perpendicular to sides 2, bottom endwall 4 generally parallel to top endwall 3, and rear section 5 generally perpendicular to sides 2 and endwalls 3 and 4, forming a cooking chamber 6 having a front opening 25 enclosable by door 7. Food support rack 8 is supported by structure 1 within cooking chamber 6 above electrical resistance heating element 9. Second heating element 10 is provided proximate the top of cooking chamber 6, for broiling. Power on-off switch 12, support feet 23, and cooking controls 13 are also provided.

Structure 1 comprises two portions, top portion 14 and a bottom portion 15. Top portion 14 comprises top endwall 3, opposed top inner sidewalls 16 and top inner rear wall 18, rigidly interconnected by conventional means such as solder, welds, snap-fittings, screws, bolts, or tongue-and-groove connections. Reflector 17 is provided adjacent to top endwall 3, immediately above heating element 10, to reflect radiant energy into cooking chamber 6. Reflector 17 incorporates front shield 21 which serves to facilitate the reflection of radiant energy into cooking chamber 6. Flanges 19 are carried by top portion 14 to support reflector 17.

Bottom portion 15 comprises bottom endwall 4, opposed bottom inner sidewalls 20, bottom front wall 22, and bottom rear wall 24, rigidly interconnected in the same manner as top portion 14. Bottom front wall 22 comprises a hollow channel of rectangular cross-section having inner wall 51, outer wall 52, and upper wall 53. Bottom rear wall 24 comprises outer wall 56 and inner wall 55. Inner wall 55 and the lower portion of outer wall 56 together form a hollow channel of rectangular cross-section between bottom inner sidewalls 20. Bottom endwall 4 is curled at its rear edge 11 to secure horizontal pivot pins 36 which are pivotally received by bottom inner sidewalls 20. Bottom endwall 4 serves as a crumb tray which can be pivoted downward for cleaning by pulling on finger hook 37.

Top inner sidewalls 16 engage bottom inner sidewalls 20, respectively, and top inner rear wall 18 engages outer wall 56 of bottom rear wall 24, to allow structure 1 to telescope between a contracted position and an expanded position. Inside faces 27 of top portion 14 slidably engage outside faces 28 of bottom portion 15, and inner rear wall 18 engages outer wall 56, so that bottom portion 15 is able to telescope into top portion 14 to vary the size of cooking chamber 6.

It is preferred that the above-described elements of top portion 14 and bottom portion 15 be constructed of metal, such as steel or aluminum, which is able to withstand the heat generated within cooking chamber 6, and which will serve as reflective surfaces for radiant energy generated within cooking chamber 6.

Affixed to top inner sidewalls 16, as by screws, are top outer sidewalls 30. Similarly affixed to bottom inner sidewalls 20 are bottom outer sidewalls 32. Similarly affixed to top inner rear wall 18 is top outer rear wall 31. Top outer sidewalls 30 and bottom outer sidewalls 32 cooperate to enable top portion 14 and bottom portion 15 to telescope relative to one another, and incorporate a mechanism whereby such telescoping can be manually accomplished. Top outer sidewalls 30 carry a pair of parallel vertical rectangular pillars 33. Bottom outer sidewalls 32 form a pair of parallel vertical channels 35 adapted to receive pillars 33 in sliding relationship, to limit movement of top portion 14 and bottom portion 15 relative to one another to vertical movement along a linear axis. Top outer sidewalls each have an aperture 38 therein, through which generally cylindrical crank shaft 39 projects. Affixed to crank shaft 39 at its interior end is main gear 42, having teeth about its perimeter, and having projection 45 offset from the rotational axis of gear 42 on shaft 39. Affixed to the exterior end of shaft 39 is handle 40, by which gear 42 can be rotated. Near the top of each of bottom outer sidewalls 32 is a generally horizontally extending track 46 adapted to receive projection 45. Gear 42 and projection 45 act together as a lever arm which rotates about shaft 39, by which top portion 14 and bottom portion 15 can be moved relative to one another.

Figure 4:
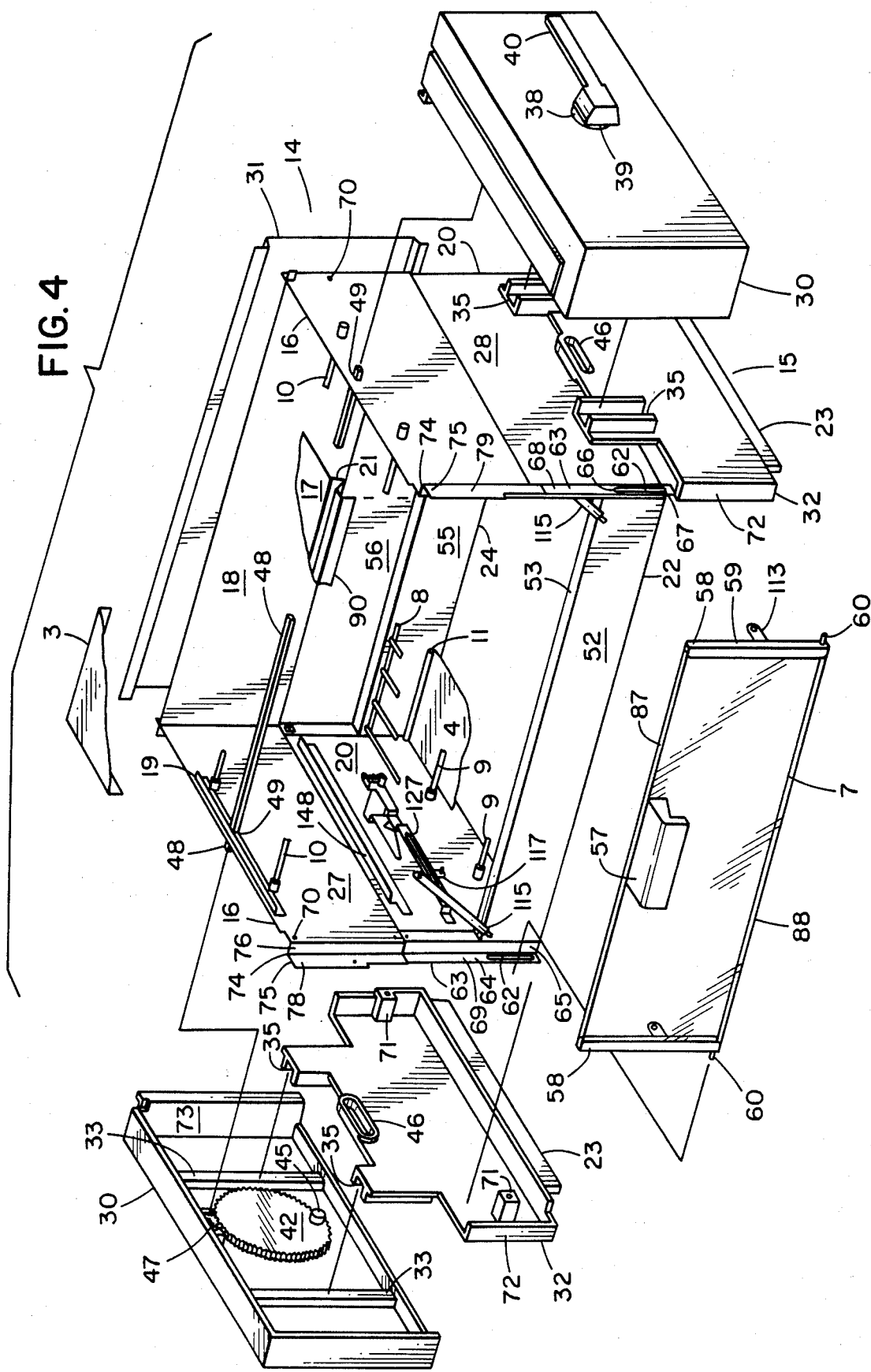
FIG. 4 is an exploded perspective view of the toaster oven of FIG. 1, in partial section.
Figure 5:
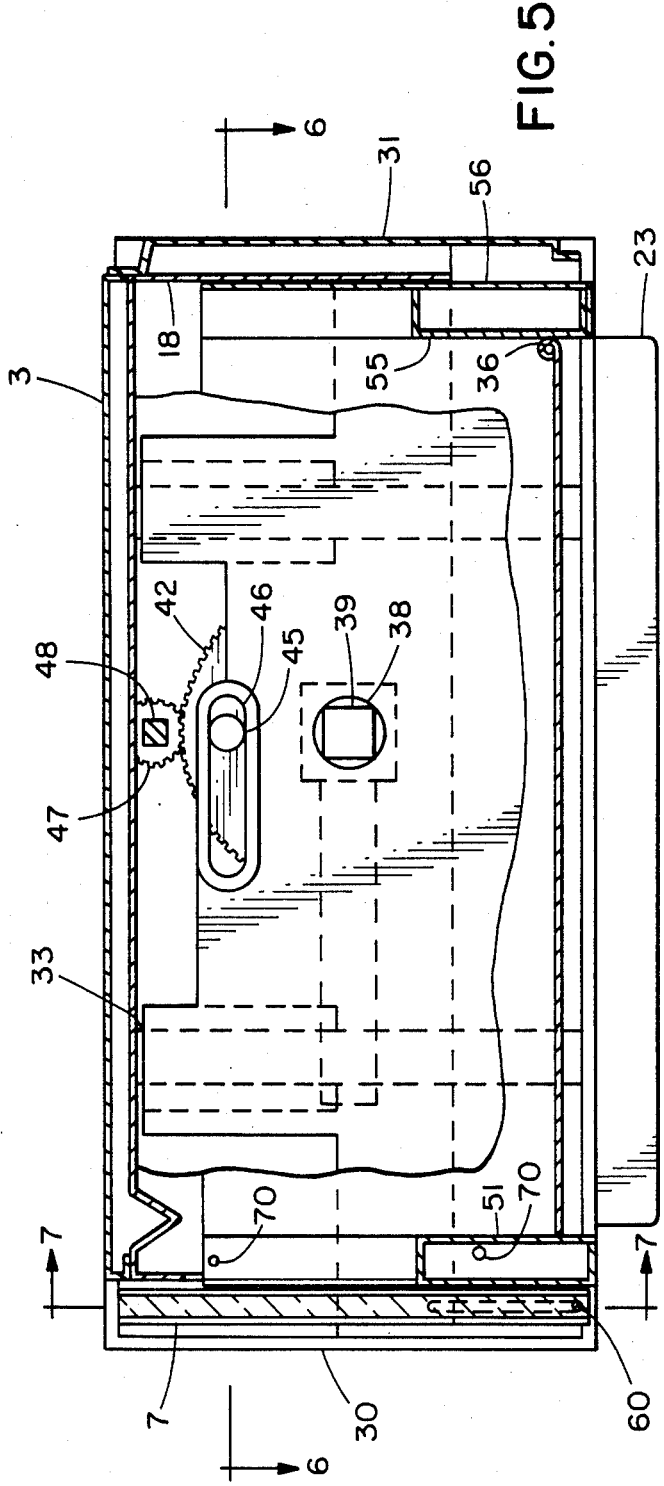
FIG. 5 is a section taken along plane 5—5 of FIG. 2, partially broken away to show details of the oven expansion mechanism with the oven in the folded position.
Figure 8:
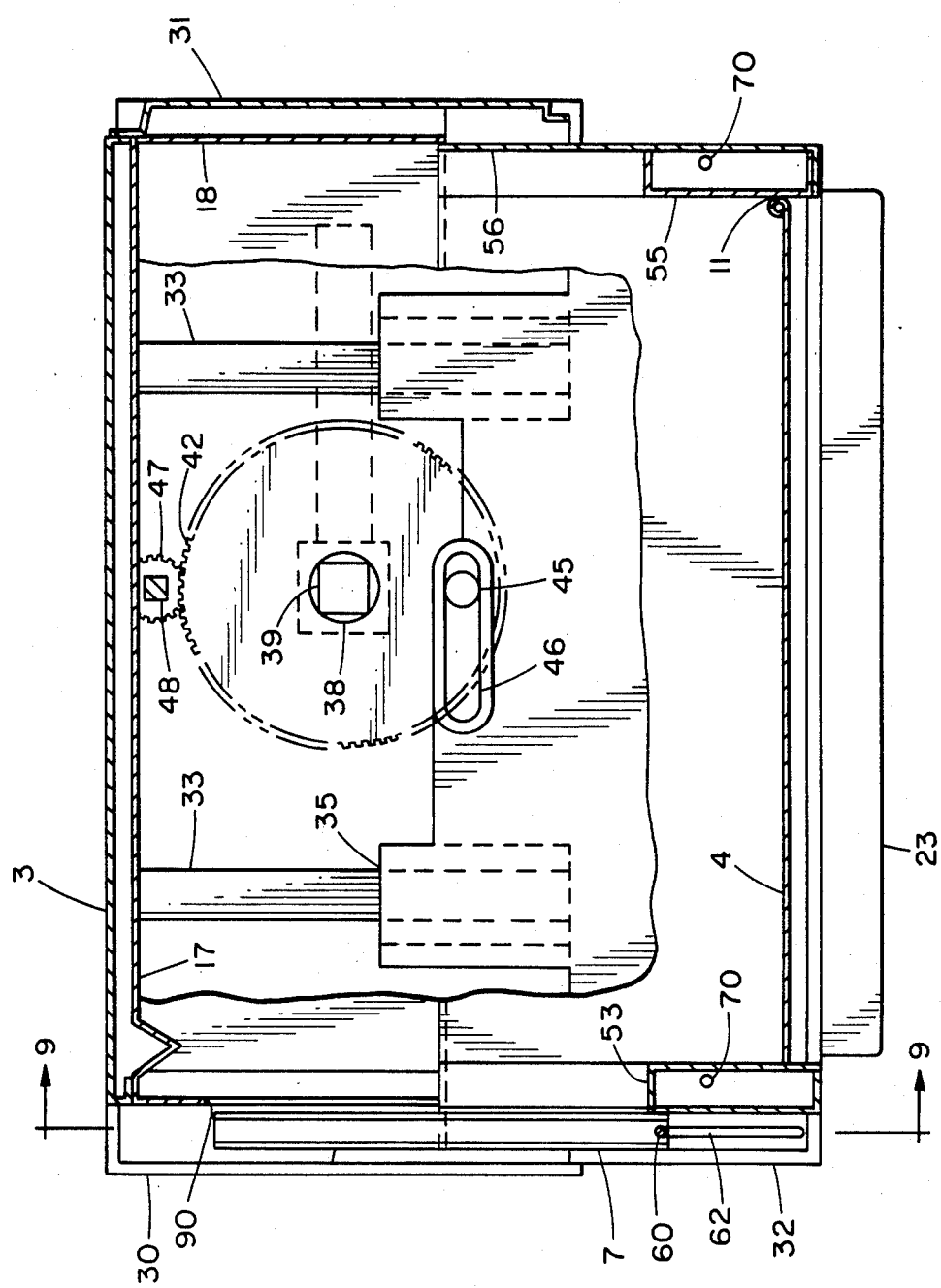
FIG. 8 is a section similar to FIG. 5, showing the oven in its expanded position.
Figure 10:
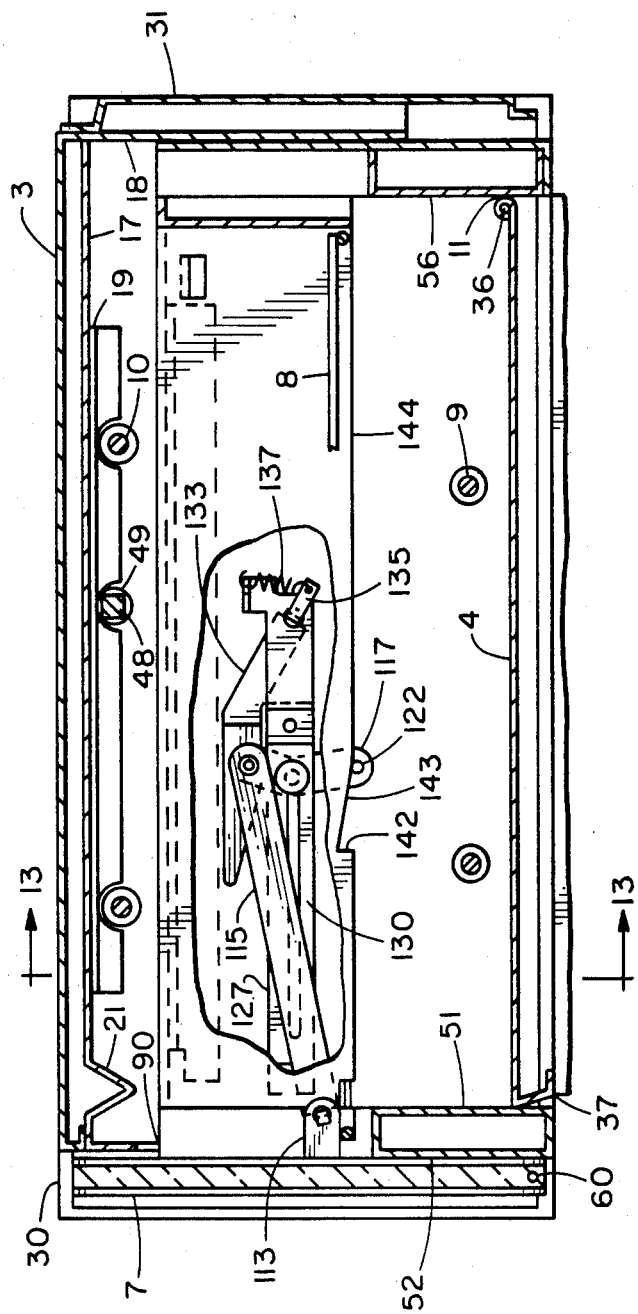
FIG. 10 is a section taken along plane 10—10 of FIG. 2, with the food support rack broken away to show the mechanism connecting the door to the tray.
Figure 11:
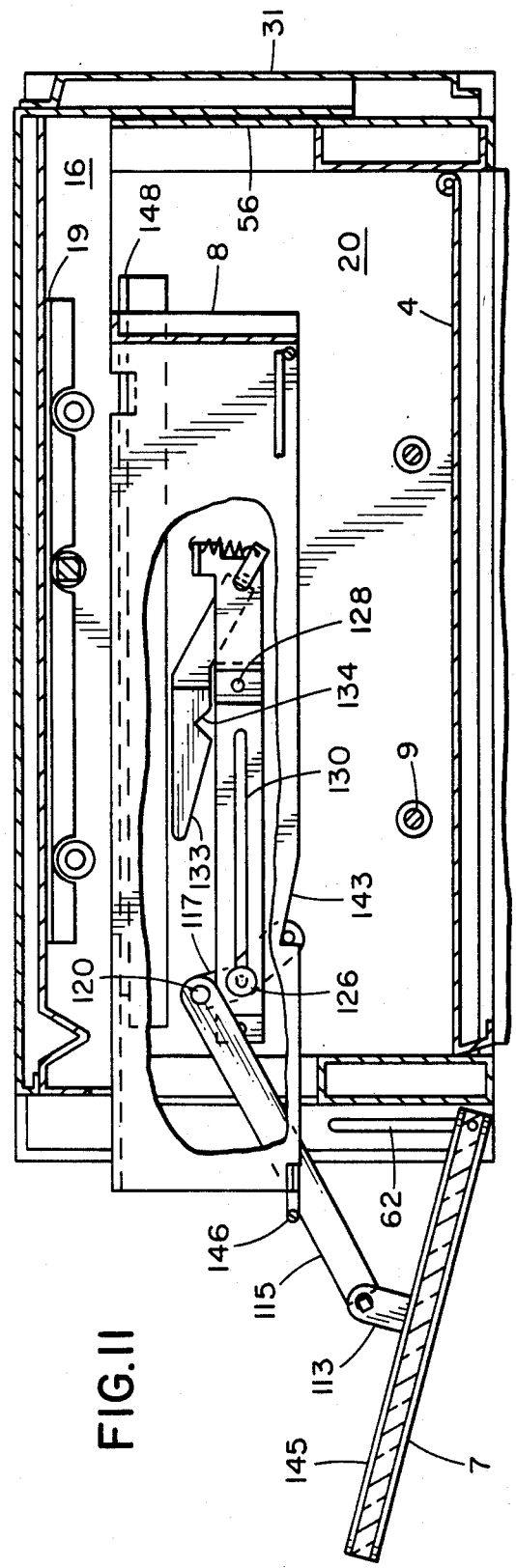
FIG. 11 is the view of FIG. 10, showing the oven door open.

As is most clearly seen in FIGS. 4, 5 and 8, when gear 42 is rotated by handle 40 such that projection 45 is at its lowermost point, structure 1 is in its expanded position with top portion 14 and bottom portion 15 moved relative to one another to create a relatively large cooking chamber 6. When gear 42 is rotated by handle 40 such that projection 45 is at its uppermost point, structure 1 is in its contracted position and top portion 14 and bottom portion 15 are telescoped together to create a relatively small cooking chamber.

It is preferred that exterior portions of structure 1, including top outer sidewalls 30, bottom outer sidewalls 32, and handle 40, be of a heat insulating material, such as plastic, to minimize the surface temperature of the portions of structure 1 with which the user is likely to come into contact. Heat insulation is also provided by the air spaces between top outer sidewalls 30 and top inner sidewalls 16, bottom outer sidewalls 32 and bottom inner sidewalls 20, endwall 3 and reflector 17, and top outer rear wall 31 and top inner rear wall 18.

While structure 1 can be constructed with a single telescoping mechanism, it is preferred that the telescoping mechanism described above be incorporated into both top outer sidewalls 30 and both bottom outer sidewalls 32, so that expansion and contraction of the toaster oven of this invention can be accomplished from either side of the oven. It will also be appreciated that a non-circular lever arm, without peripheral teeth, can be substituted for gear 42. However, a lever arm in the form of gear 42 is preferred because it facilitates smooth operation of the telescoping mechanism, as will be described more fully below.

Each of top outer sidewalls rotationally carry a secondary gear 47 having teeth which intermesh with the teeth of one of main gears 42. Affixed to the axis of each secondary gear 47, and passing through apertures 49 in top inner sidewalls 16, is a common connecting shaft 48, generally parallel to crank shaft 39. Connecting shaft 48 serves to operatively connect main gears 42 to one another, so that rotation of either one of handles 40 causes main gears 42 to rotate simultaneously. Employment of secondary gears 47 and connecting shaft 48 reduces the likelihood of binding of top portion 14 and bottom portion 15, since leverage forces for expansion and contraction are exerted on both sides of structure 1 simultaneously.

In the preferred embodiment of this invention top inner sidewalls 16 and bottom inner sidewalls 20 telescope relative to one another, ie., the upper section of bottom portion 15 is received by portion 14 when structure 1 is in its collapsed position. It is understood that in an alternative embodiment, top portion 14 and bottom portion 15 abut one another, without overlapping, when structure 1 is in its contracted position. In that alternative embodiment, when structure 1 is in its expanded position top portion 14 and bottom portion 15 are spaced apart, defining side and rear openings communicating with cooking chamber 6. Bottom outer sidewalls 32, and top outer rear wall 31, are proximate said side and rear openings, respectively, to enclose cooking chamber 6.

Top outer sidewalls 30 are constructed such that when structure 1 is in its contracted position, top outer sidewalls 30 enclose substantially all of the sides of structure 1. In other words, in the contracted position of structure 1, the height of structure 1 is generally defined by the height of top outer sidewalls 30.

It will be appreciated that alternative means for expanding and contracting structure 1 fall within the scope of this invention. For example, an X-linkage, comprising two elongated elements crossing to form an X pattern and connected pivotally to one another at the center can be used. One of the two upper ends of the linkage is pivotally connected to top inner sidewall 16 and the other upper end of the linkage is slidably and pivotally connected to top inner sidewall 16. In a similar manner, one of the two lower ends of the linkage is pivotally connected to bottom inner sidewall 20 and the other lower end of the linkage is slidably and pivotally connected to bottom inner sidewall 20. The linkage can be expanded and contracted to expand and contract structure 1 by a rotating member attached to one of the linkages adjacent to its center pivot point, or by a sliding control attached to one of the linkages at the point at which it is slidably connected to the bottom inner sidewall 20 or the top inner sidewall 16. As noted above, the arrangement first described above and illustrated in the drawings, comprising the use of gears 42, projections 45, and tracks 46 is preferred. In that preferred embodiment, the friction between track 46 and projection 45 creates a resistance to movement of top portion 14 relative to bottom portion 15 sufficient to counteract the force of gravity to hold structure 1 in its expanded position or its collapsed position. No additional means are necessary to secure or lock structure 1 in its expanded position or its contracted position. In the most preferred embodiment, when structure 1 is in its expanded position and in its contracted position crank shaft 39 and projection 45 lie along a vertical line.

Figure 12:
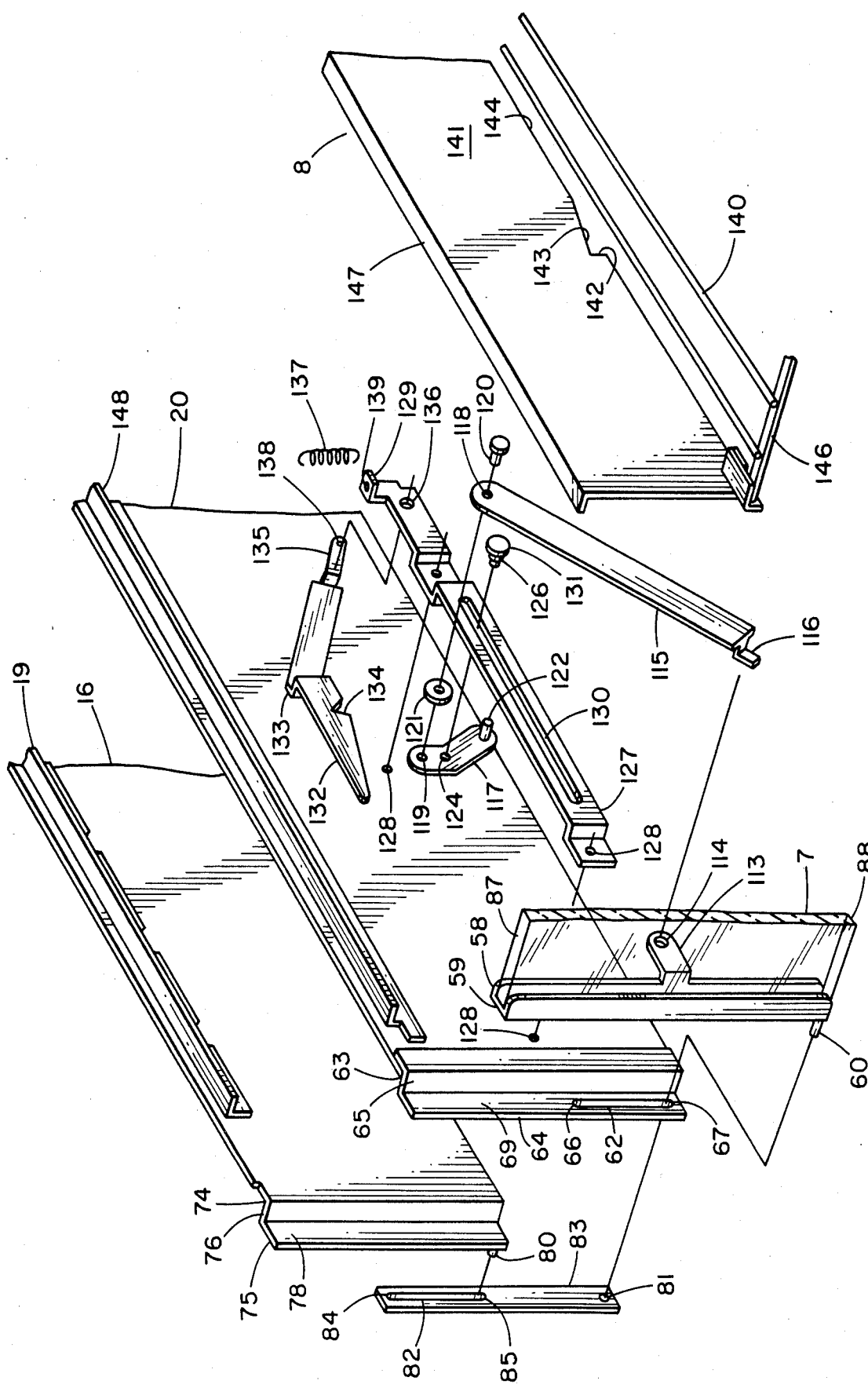
FIG. 12 is a partial exploded view of the oven of this invention, showing the door hinge mechanism and the door-rack connecting mechanism.

Door 7 is pivotally attached to structure 1 such that it can enclose cooking chamber 6 when structure 1 is in either its expanded or contracted position. The preferred method of attachment of door 7 to structure 1 is best shown in FIGS. 4 and 12. Door 7 comprises a generally rectangular planar member, preferably of glass, having a central handle 57. Affixed to the glass portion of door 7 are metal channels 58 comprising opposed door shoulders 59 which carry generally horizontal pivot pins 60 at their lowermost ends. Bottom inner sidewalls 20 of structure 1 carry bottom oven shoulders 63, comprising generally parallel lower lateral walls 64 and lower abutment walls 65. Each of lateral walls 64 forms a first slot 62 extending generally vertically having an upper lateral shoulder 66 and a lower lateral shoulder 67. Slots 62 are adapted to rotatably and slidably receive pivot pins 60. Each of lateral walls 64 has a front face 68 and an opposite rear face 69. When door 7 is closed, rear faces 69 are adjacent to, and generally parallel to, door shoulders 59, and channels 58 are adjacent to abutment walls 65.

Top inner sidewalls 16 of structure 1 carry top oven shoulders 74 comprising generally parallel upper lateral walls 75 and upper abutment walls 76. Each of lateral walls 75 has a first face 78 and a second face 79. First faces 78 of upper lateral walls 75 are adjacent to, and generally parallel to, front faces 68 of lower lateral walls 64. Second faces 79 each carry a finger 80 projecting generally horizontally from faces 79. Each of fingers 80 is slidably received by a second slot 82 formed in the upper portion of one of a pair of connector rods 83. Second slot 82 has a top shoulder 84 and a bottom shoulder 85. The lower portion of each connector rod 83 has an aperture 81 adapted to rotatably receive one of pivot pins 60.

When structure 1 is in its contracted position, pivot pins 60 are located adjacent to lower lateral shoulders 67 and fingers 80 are located adjacent to bottom shoulders 85. Fingers 80 prevent connector rods 83 from moving upward. Because pivot pins 60 are secured to connector rods 83 in apertures 81, substantial vertical movement of pivot pins 60 is prevented, while rotational movement of pivot pins 60 is permitted. In the contracted position of structure 1, upper lateral walls 75 are adjacent to lower lateral walls 64 and upper abutment walls 76 are adjacent to lower abutment walls 65. In the contracted position of structure 1, the lower edge 88 of door 7, and the door axis created by pivot pins 60, are adjacent to bottom endwall 4 and the upper edge 87 of door 7 is adjacent to top endwall 3. In other words, in the contracted position structure 1 is of an overall height approximately equal to the height of door 7.

When structure 1 is in its expanded position, pivot pins 60 are located adjacent to upper lateral shoulders 66 and fingers 80 are located adjacent to top shoulders 84. Fingers 80 prevent connector rods 83 from moving downward. Substantial vertical movement of pivot pins 60 is prevented, while rotational movement of pivot pins 60 is permitted. In the expanded position of structure 1, the lower edge 88 of door 7, and the door axis created by pivot pins 60, are adjacent to upper wall 53 of bottom front wall 22 and the upper edge 87 of door 7 is adjacent to the lower front edge 90 of reflector 17. In other words, the height of front opening 25 of cooking chamber 6 is approximately equal to the height of door 7.

It will be recognized that alternative embodiments exist within the scope of this invention. For example, connector rods 83 can carry pivot pins 60 instead of having apertures 81. In that embodiment, pivot pins 60 project through first slots 62 and are received by apertures 81 in door shoulders 59. As another example, connector rods 83 can comprise integral extensions of upper lateral sidewalls 75 rather than separate members. In that case, door 7 is fixed vertically with respect to top portion 14. In the case of the preferred embodiment described above, in which connector rods 83 are separate members having second slots 82, door 7 moves vertically with respect to both bottom portion 15 and top portion 14 as structure 1 is moved between its expanded and contracted positions.

In another alternative embodiment, door 7 is hinged from top portion 14 rather than bottom portion 15. The structure comprises an inversion or reversal of parts of the embodiment described above.

Figure 16:
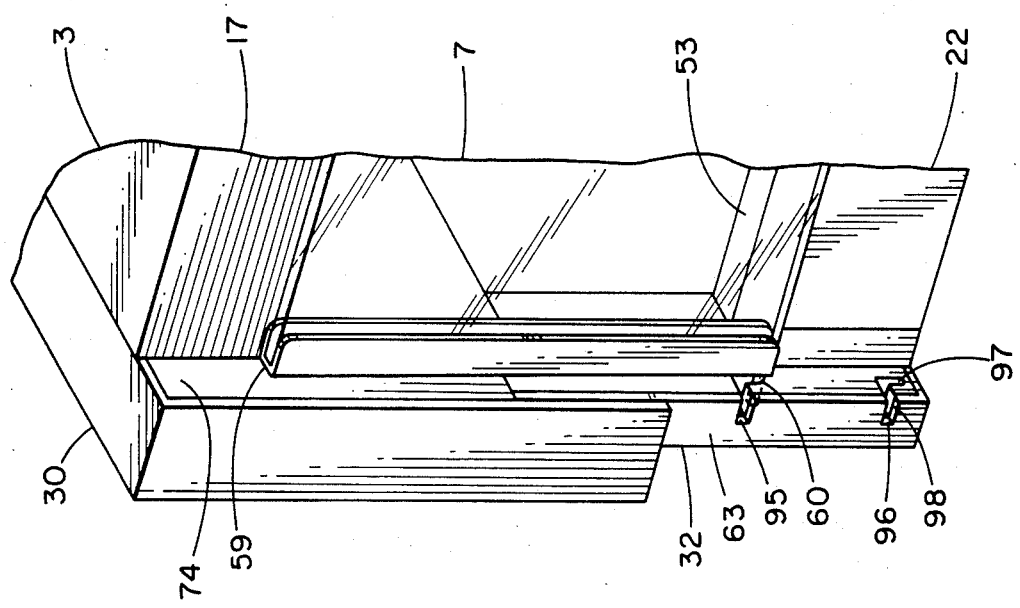
FIG. 16 is a partial perspective view of the door hinge mechanism of an alternative embodiment of the toaster oven of this invention.

Another alternative embodiment is illustrated in FIG. 16. Door 7 does not slide between a first position and a second position, as in the case of the embodiments described above, but rather must be removed from structure 1 and relocated to the desired position. Bottom oven shoulders 63 form a pair of upper passages 95 and of lower passages 96. Upper passages 95 receive pivot pins 60 when structure 1 is in its expanded position, and lower passages 96 receive pivot pins 60 when structure 1 is in its contracted position. Passages 95 and 96 comprise U-shaped channels 97 in which pivot pins 60 reside after insertion through generally horizontal entrances 98.

Figure 17:
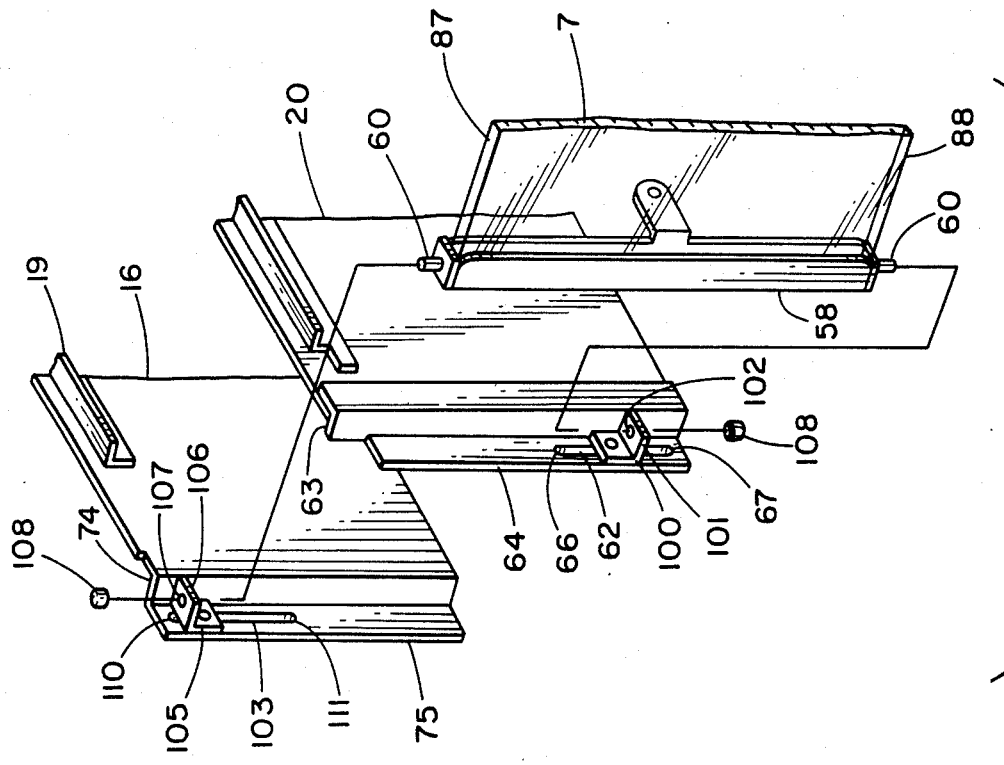
FIG. 17 is a partial perspective view of the door hinge mechanism of a second alternative embodiment of the toaster oven of this invention.

Another alternative embodiment is illustrated in FIG. 17. Door 7 carries a pivot pin 60 on its upper edge 87 and an opposed pivot pin 60 on its lower edge 88. Pivot pins 60 are carried by channel 58 and are aligned to form a vertical pivot axis about which door 7 pivots to open and close. One of lower lateral walls 64 forms a first slot 62 extending generally vertically. A portion of lower bracket 100 is slidably received by first slot 62 such that lower bracket 100 can slide vertically on lower lateral wall 64 and is restrained from horizontal movement along lower lateral wall 64. Ledge 101 on lower bracket 100 forms a lower aperture 102 adapted to receive one of pivot pins 60. Upper lateral wall 75 adjacent to lower lateral wall 64 forms a second slot 103 extending generally vertically. A portion of upper bracket 105 is slidably received by second slot 103 such that upper bracket 105 can slide vertically on upper lateral wall 75 and is restrained from horizontal movement along upper lateral wall 75. Ledge 106 on upper bracket 105 forms an upper aperture 107 adapted to receive one of pivot pins 60. Caps 108 fit over pivot pins 60 to secure pivot pins 60 to lower bracket 100 and upper bracket 105. When structure 1 is in its contracted position, lower bracket 100 is located adjacent to lower shoulder 67 and upper bracket 105 is located adjacent to top shoulder 110. When structure 1 is in its expanded position, lower bracket 100 is located adjacent to upper shoulder 66 and upper bracket 105 is located adjacent to bottom shoulder 111. As in the case of the preferred embodiment described above, door 7 is held securely in place to prevent substantial vertical movement, but to allow pivotal movement, in both the expanded and contracted positions of structure 1.

When door 7 is opened, food rack 8 is partially withdrawn from structure 1 to facilitate access to food supported thereon. As can best be seen in FIGS. 4, 10, 11, and 12, affixed to door 7 adjacent to shoulders 59 are brackets 113 having holes 114 therethrough. Bracket 113 is most conveniently an extension of metal channel 58. First lever arm 115 is pivotally attached to bracket 113 by L-bracket 116 formed in one end of arm 115. L-bracket 116 extends through hole 114. Arm 115 is generally straight and extends into cooking chamber 6. The other end of first lever arm 115 is pivotally attached to second lever arm 117. Pin 120 is affixed to arm 115, and extends through holes 118 and 119 in arms 115 and 117, respectively, and is crimped in place. Washer 121 facilitates the rotational movement of arms 115 and 117 relative to one another. Second arm 117 comprises an angled member having leg 122 projecting perpendicularly therefrom at the end of arm 117 opposite hole 119. Orifice 124 through the central portion of arm 117 is adapted to receive slide member 126, which is crimped in place in orifice 124.

Bottom inner sidewalls 20 carry generally horizontal brackets 127, affixed to sidewalls 20 by screws through screw holes 128 or by any other convenient means. Bracket 127 defines elongated groove 130 adapted to slidably receive slide member 126. Slide member 126 has an enlarged head 131 which limits movement of arm 117 relative to bracket 127 to sliding movement along groove 130.

Latch 133 is pivotally attached to bracket 127 and serves to removably secure door 7 in its closed position. Latch 133 comprises a front member 132 in generally the same plane as bracket 127 having a notch 134 which is adapted to be received by washer 121. Latch 133 has a rear member 135 which extends through aperture 136 in bracket 127 to permit latch 133 to pivot about an axis through aperture 136 relative to bracket 127. Spring 137 biases latch 133 in a first position in which notch 134 can receive washer 121. Spring 137 is affixed to rear member 135 through hole 138 and to bracket 127 through hole 139 in flange portion 129.

Food support rack 8 comprises a generally horizontal grid 140 and upstanding sides 141 which serve to catch spattered foods. Sides 141 have outstanding flanges 147 at their upper edges which slidably engage flanges 148 affixed to inner sidewalls 20, to support food rack 8 within cooking chamber 6. Sides 141 have steps 142 at their lowermost edges, adapted to receive legs 122. As can best be seen in FIG. 10, when door 7 is closed, spring 137 biases latch 133 downward to engage notch 134 with washer 121 to prevent door 7 from inadvertently opening. When door 7 is pulled to open it, arm 115 pulls pin 120 forward, and washer 121 forces latch 133 upward against spring 137, releasing door 7. At the same time, lever arm 115 pulls lever arm 117 forward, causing arm 117 to slide along bracket 127. As can best be seen in FIG. 11, the force of lever arm 115 on arm 117 also causes arm 117 to rotate counterclockwise slightly about slide member 126, raising leg 122 and allowing leg 122 to engage step 142. As door 7 is further opened, the engagement of leg 122 and step 142 causes door 7 to pull the front portion of rack 8 along flanges 148 and through front opening 25. In the preferred embodiment, gravity will hold door 7 open.

When door 7 is in the open position, rack 8 extends partially through front opening 25 for easy access to food supported thereon. In addition, rack 8 can be completely removed from cooking chamber 6 by pulling rack 8 forward through opening 25. As rack 8 is pulled forward, leg 122 slides along inclined surface 143 adjacent to step 142 until leg 122 engages underside 144 of rack 8. Continuing to slide rack 8 along flanges 148 will remove rack 8 from structure 1. Rack 8 can be reinserted into cooking chamber 6 by placing flanges 147 over flanges 148 and sliding rack 8 rearward into cooking chamber 6. Use of this arrangement of parts provides a rack 8 which is held in place while door 7 is open, yet which can be easily removed for cleaning.

As door 7 is closed, lever arm 115 causes arm 117 to rotate clockwise, removing leg 122 from step 142. As door 7 is further closed, rear face 145 of door 7 engages front surface 146 of rack 8, causing rack 8 to slide along flanges 148 and to retract into cooking chamber 6. As door 7 is fully closed, washer 121 engages member 132 and forces it upward against spring 137 until notch 134 of latch 133 engages washer 121 to secure door 7 in its closed position.

As will be recognized, various alternative embodiments fall within the scope of this invention. Pin 120 and slide member 126 can be secured in place by any convenient means, such as crimping or use of a screw or bolt. Latch 133 can be pivotally attached to bracket 127 by use of a pin or screw. Lever arm 117 can be permanently affixed to rack 8, or lever arm 117 can be omitted and lever arm 115 can be affixed directly to rack 8.

Figures 14, 15:
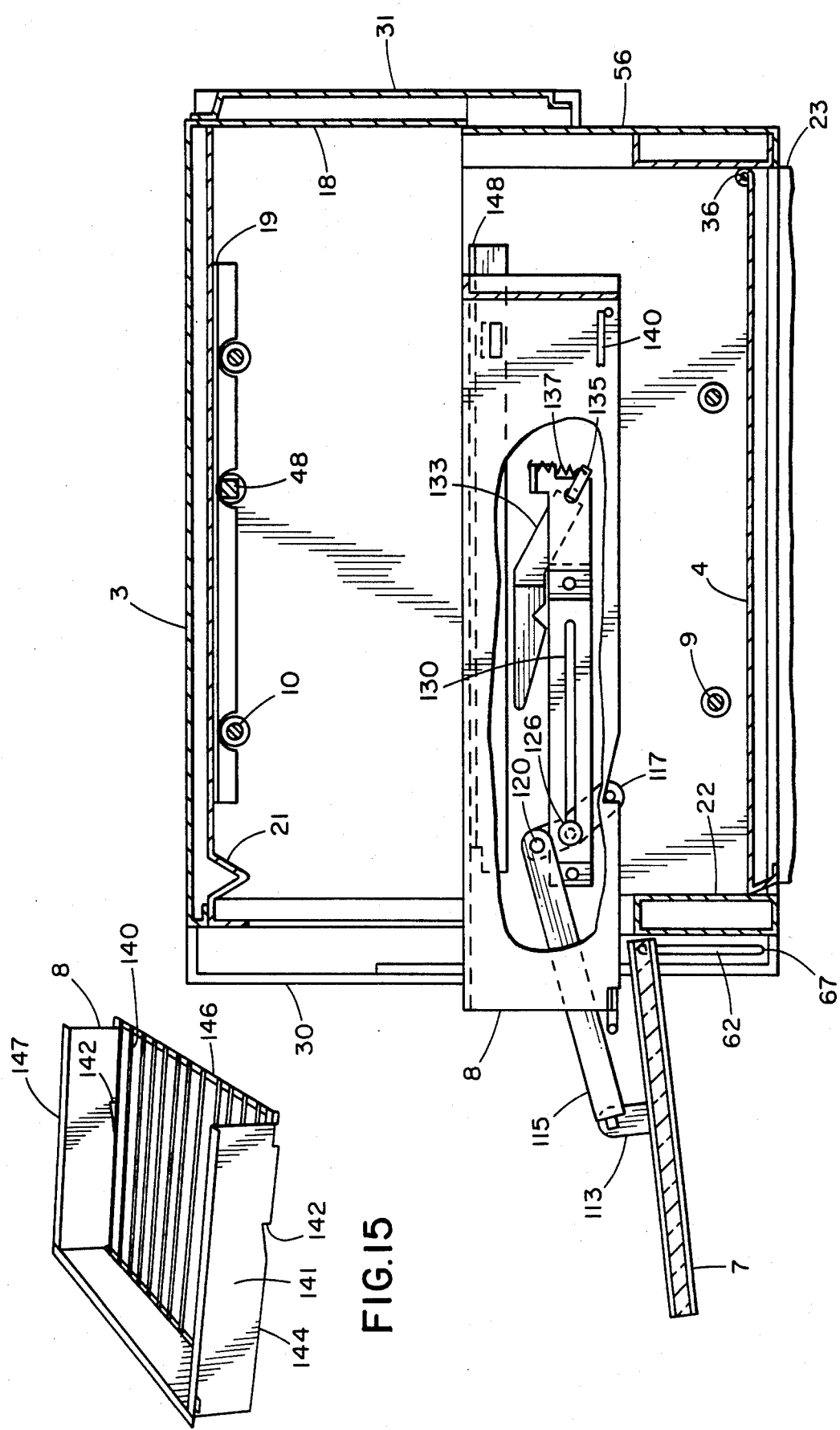
FIG. 14 is a the view of FIG. 11, but showing the toaster oven in its expanded position.
FIG. 15 is a perspective view of the food support rack.

Rack 8 is fixed vertically with respect to bottom portion 15 while door 7, in the preferred embodiment, moves vertically with respect to bottom portion 15 between the expanded position and the contracted position of structure 1. Nevertheless, as is clearly seen in comparing FIGS. 11 and 14, the above-described mechanism for securing door 7 to structure 1 and for withdrawing rack 8 from structure 1 as door 7 is opened operates in both the expanded and contracted positions of structure 1.

Top outer sidewalls 30 and bottom outer sidewalls 32 can be attached to top inner sidewalls 16 and bottom inner sidewalls 20, respectively, by any convenient means. One convenient means comprises passing screws through screw holes 70 into outer sidewalls 30 and screw blocks 71.

Figure 6:
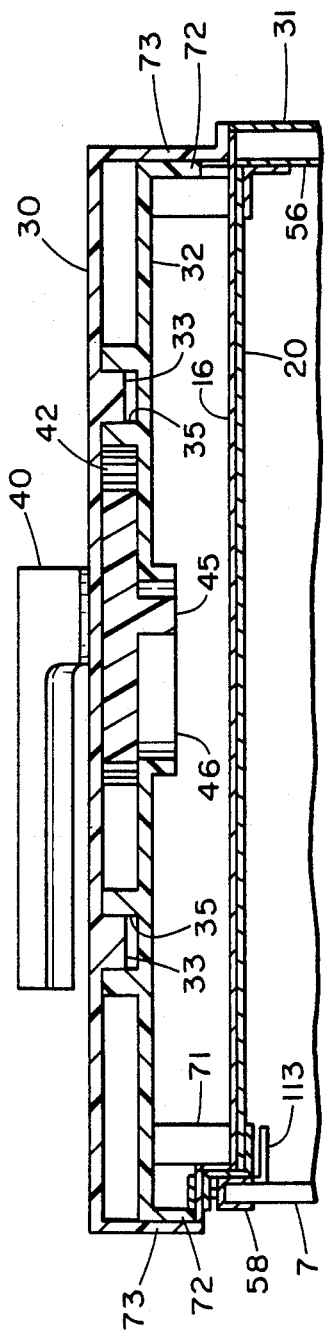
FIG. 6 is a partial section taken along plane 6—6 of FIG. 5, showing details of the interconnection of the oven portions.
Figure 7:
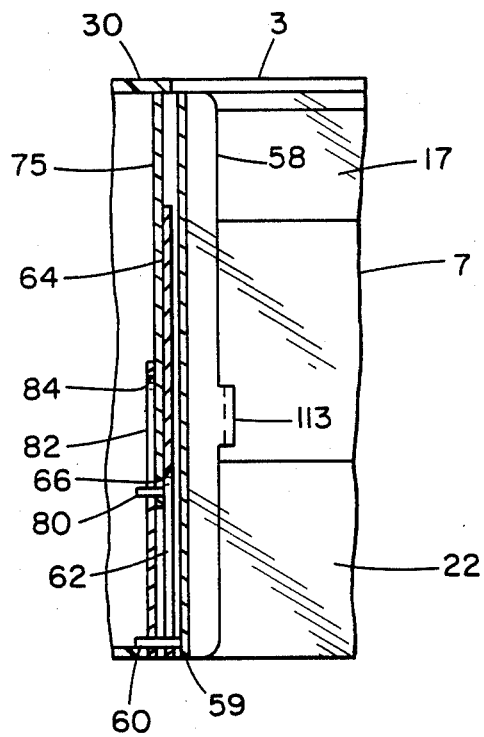
FIG. 7 is a partial section taken along plane 7—7 of FIG. 5, showing details of the door hinge mechanism with the oven in its folded position.
Figure 9:
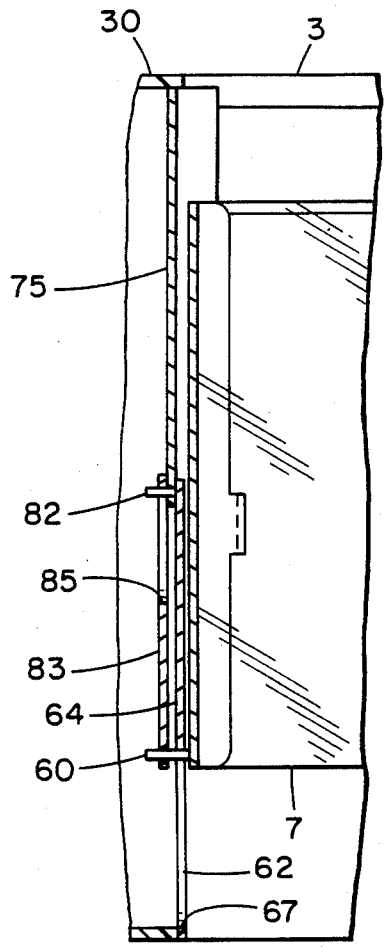
FIG. 9 is a partial section taken along plane 9—9 of FIG. 8, showing details of the door hinge mechanism with the oven in its expanded position.
Figure 13:
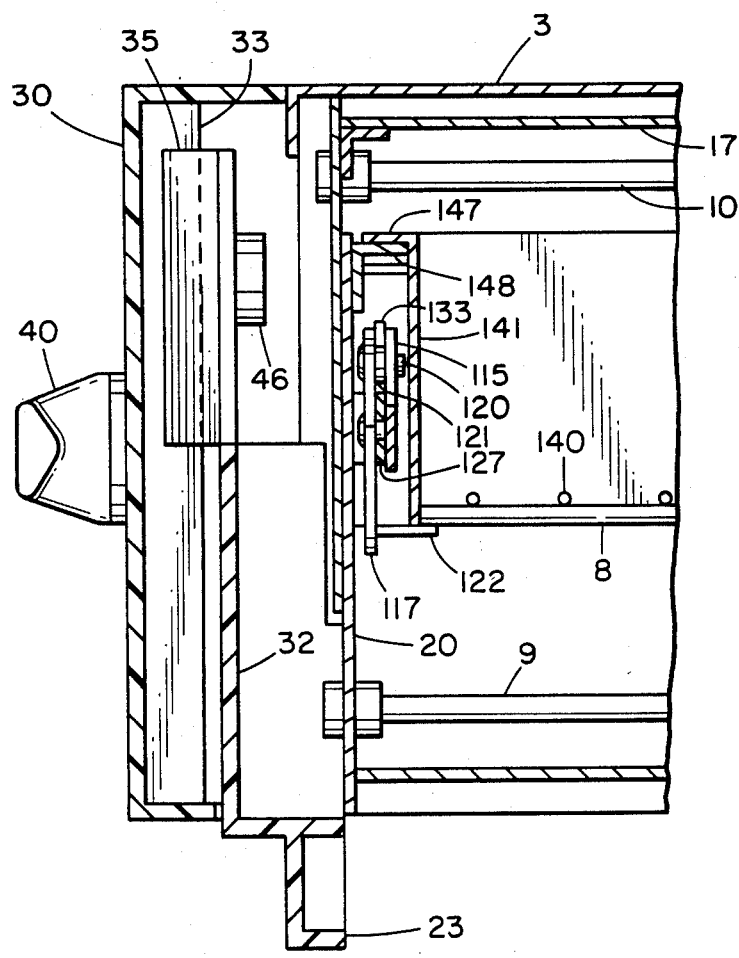
FIG. 13 is a partial section taken along plane 13—13 of FIG. 10, showing the door hinge mechanism.

As can best be seen in FIG. 6, top outer sidewalls 30 and bottom outer sidewalls 32 interfit to provide smooth vertical movement. Not only do pillars 33 slide in channels 35, but side shoulders 72 of bottom sidewalls 32 slide against shoulders 73 of top sidewalls 30.

The toaster oven of this invention can be supported by feet 23 for countertop use, or it can be suspended by top endwall 3 or top outer sidewalls 30 for under-cabinet use.

We claim:

1. An oven having variable spacial volume, comprising box-like structure having a first oven portion including a first endwall, a first rear wall, and first sidewalls, and having a second oven portion including a second endwall, a second rear wall adjacent to said first rear wall, and second sidewalls, said first oven portion and said second oven portion together forming a cooking chamber having a front opening, a food support rack carried by said structure within said cooking chamber, said structure being adapted to be telescopingly movable along an oven axis through said first oven portion and said second oven portion to a compact position in which said cooking chamber is of a first volume and said front opening is of a first size, and to an expanded position in which said cooking chamber is of a larger second volume and said front opening is of a larger second size, means for selectively moving said structure to said compact position and said expanded position, and a door carried by said structure, said door having a first door shoulder and an opposed second door shoulder and said structure having a first oven shoulder adjacent to said first door shoulder and an opposed second oven shoulder adjacent to said second door shoulder, said door being pivotable about a pivot between an open position to allow access to said cooking chamber and a closed position to cover said front opening, said door and said pivot being movable between a first closed position corresponding to said compact position of said structure and a second closed position corresponding to said expanded position of said structure, in each of said compact and expanded positions said door being secured in place on said structure from substantial movement parallel to said oven axis.

2. The oven of claim 1 wherein said first oven shoulder is carried by said first oven portion and said second oven shoulder is carried by said second oven portion, and said door pivots about a door axis generally parallel to said oven axis.

3. The oven of claim 1 wherein one of said first door shoulder and said first oven shoulder carries a first pivot pin located on said door axis, the other of said first door shoulder and said first oven shoulder defines a first orifice on said door axis adapted to receive said first pivot pin, one of said second door shoulder and said second oven shoulder carries a second pivot pin located on said door axis, the other of said second door shoulder and said second oven shoulder defines a second orifice on said door axis adapted to receive said second pivot pin, said door axis being generally transverse to said oven axis.

4. The oven of claim 3 wherein means are provided to move said door axis between a first position corresponding to said compact position of said structure and a second position corresponding to said expanded position of said structure, said axis in said second position being at a greater distance from said first endwall than in said first position.

5. The oven of claim 4 wherein said door shoulders comprise a pair of generally parallel door end walls, said oven shoulders are carried by said first oven portion and comprise a pair of generally parallel first lateral walls, each of said first lateral walls having a front face and an opposite rear face, said rear face being adjacent to one of said door end walls and generally parallel thereto, each of said first lateral walls having a first side wall having a first lateral shoulder and a second lateral shoulder and defining an elongated first slot, said first slots adapted to slidably and rotatably receive said pivot pins, said second oven portion having a pair of second lateral walls each having a first face and a second face, each of said first faces being adjacent to one of said front faces, a pair of connector walls, each of which is cooperative with one of said second lateral walls, each of said connector walls having a first end having an aperture adapted to rotatably receive one of said pivot pins, said pivot pins being received by said apertures and by said first slots adjacent said first lateral shoulders thereof when said structure is in said compact position, and said pins being received by said apertures and by said first slots adjacent said second lateral shoulders thereof when said structure is in said expanded position.

6. The oven of claim 5 wherein each of said second faces carries a finger and each of said connector walls comprises a connector rod located adjacent to each of said second faces having a second end having a first side shoulder and a second side shoulder defining an elongated second slot adapted to slidably receive one of said fingers, said fingers being received by said second slots adjacent said first side shoulder when said structure is in said compact position, and said fingers being received by said second slots adjacent said second side shoulders when said structure is in said expanded position.

7. The oven of claim 4 wherein said first oven portion has a front wall having a first oven edge spaced from said first endwall defining a portion of said front opening, said door axis being proximate said first endwall in said first position and proximate said first oven edge in said second position.

8. The oven of claim 7 wherein said door carries said pivot pins and said first oven shoulder defines a first passage and a second passage, said first passage adapted to removably receive one of said pivot pins to provide support for said door in said first position, and said second passage adapted to removably receive one of said pivot pins to provide support for said door in said second position.

9. The oven of claim 7 wherein said second oven portion has a forward wall having a second oven edge spaced from said first oven edge defining a portion of said front opening and said door has a first door edge proximate said door axis and an opposed second door edge, said first door edge being proximate said first endwall and said second door edge being proximate said second endwall when said door axis is in said first position, and said first door edge being proximate said first oven edge and said second door edge being proximate said second oven edge when said door axis is in said second position.

10. An oven having variable spacial volume, comprising a box-like structure having a first oven portion and a second oven portion, and means for telescoping said first oven portion and said second oven portion relative to one another, said means comprising a first wall on said first oven portion forming a first track generally transverse to the direction of telescoping movement of said structure, a first lever arm carried by said second oven portion pivotable about a first axis, having a first projection offset from said first axis adapted to be received by said first track in sliding engagement therewith, said second oven portion having a wall defining an opening on said first axis adapted to rotatably receive a first crank shaft, said first crank shaft having a proximate end to which is affixed said first lever arm, and having a distal end to which is affixed a first handle by which said first crank shaft can be rotated.

11. The oven of claim 10 wherein said first sidewalls comprise a first righthand sidewall and a first lefthand sidewall generally parallel thereto, said second sidewalls comprise a second righthand sidewall and a second lefthand sidewall generally parallel thereto, said first wall is on said first righthand sidewall and said first lever arm is carried by said second righthand sidewall, said means for moving said structure comprise a second lever arm and a second track, said second lever arm being carried by said second lefthand sidewall and said second track being formed by a second wall on said first lefthand sidewall, said second lever arm being adapted to pivot about said first axis and having a second projection offset from said first axis adapted to be received by said second track in sliding engagement therewith.

12. The oven of claim 11 wherein said means comprises a connecting shaft operatively connecting said first projection and said second projection.

13. The oven of claim 12 wherein said first lever arm comprises a generally circular first gear which carries said first projection proximate its perimeter, said second lever arm comprises a generally circular second gear which carries said second projection proximate its perimeter, said connecting shaft is rotatable about a second axis and has a proximate end adjacent said second righthand sidewall and a distal end adjacent said second lefthand sidewall, a third gear is carried by said proximate end of said connection shaft, said third gear operatively engaging said first gear, a fourth gear is carried by said distal end of said connecting shaft, said fourth gear operatively engaging said second gear.

14. An oven having variable spacial volume and a front opening of variable size enclosable by a door, comprising a first oven portion and a second oven portion together defining a food cooking chamber which communicates with said front opening, said first oven portion including a pair of opposed first sidewalls, a first endwall and a first rear wall between said first sidewalls, and said second oven portion including a pair of opposed second sidewalls, each of which is adjacent to one of said first sidewalls, a second rear wall between said second sidewalls adjacent to said first rear wall, and a second endwall, said first oven portion and said second oven portion being movable with respect to one another to a first position in which said cooking chamber is of a first volume and said front opening is of a first size, and to a second position in which said cooking chamber is of a larger second volume and said front opening is of a larger second size, means for selectively moving said first oven portion and said second oven portion relative to one another to said first position and to said second position, and a door carried by said first oven portion and movable about a pivot, said door and said pivot movable to a first location proximate said first endwall, corresponding to said first position of said first oven portion and said second oven portion, in which said door is pivotable to a closed position to cover said opening and to an open position to allow access to said cooking chamber, and said door and said pivot movable to a second location more distant from said first endwall than said first location, corresponding to said second position of said first oven portion and said second oven portion, in which said door is pivotable to a closed position to cover said opening and to an open position to allow access to said cooking chamber.

15. The oven of claim 14 wherein said door has a pair of generally parallel door end walls, each of which carries a pivot pin, said first oven portion has a pair of generally parallel first lateral walls each of which is adjacent to one of said door end walls, each of said first lateral walls having a front face and an opposite rear face, said rear face being adjacent to one of said door end walls and generally parallel thereto, each of said first lateral walls having a first side wall having a first lateral shoulder and a second lateral shoulder and defining an elongated first slot, each of said first slots adapted to slidably and rotatably receive one of said pivot pins, said second oven portion having a pair of second lateral walls each having a first face and a second face, each of said first faces being adjacent to one of said front faces, a pair of connector walls, each of which is adjacent to and cooperative with one of said second lateral walls, each of said connector walls having a first end having an aperture adapted to rotatably receive one of said pivot pins, said pivot pins being received by said apertures and by said first slots adjacent said first lateral shoulders thereof when said first oven portion and said second oven portion are in said first position, and said pins being received by said apertures and by said first slots adjacent said second lateral shoulders thereof when said first oven portion and said second oven portion are in said second position.

16. The oven of claim 14 wherein said means for moving said first oven portion and said second oven portion relative to one another comprises a first wall on said first oven portion forming a first track, a first lever arm carried by said second oven portion pivotable about a first axis, having a first projection offset from said first axis, said first projection adapted to be received by said first track in sliding engagement therewith, and means to pivot said first lever arm about said first axis.

17. The oven of claim 16 wherein said first sidewalls comprise a first righthand sidewall and a first lefthand sidewall generally parallel thereto, said second sidewalls comprise a second righthand sidewall and a second lefthand sidewall generally parallel thereto, said first wall is on said first righthand sidewall and said first lever arm is carried by said second righthand sidewall, said means for moving said first oven portion and said second oven portion relative to one another comprise a second lever arm and a second track, said second lever arm being carried by said second lefthand sidewall and said second track being formed by a second wall on said first lefthand sidewall, said second lever arm being adapted to pivot about said first axis and having a second projection offset from said first axis adapted to be received by said second track in sliding engagement therewith.

18. An oven having variable spacial volume, comprising box-like structure having a first oven portion including a first endwall, a first rear wall, and first sidewalls, and having a second oven portion including a second endwall, a second rear wall adajcent to said first rear wall, and second sidewalls, said first oven portion and said second oven portion together forming a cooking chamber having a front opening, a food support rack carried by said structure within said cooking chamber, said first oven portion and said second oven portion being adapted to be movable with respect to one another to a first position in which said cooking chamber is of a first volume and said front opening is of a first size, and to a second position in which said cooking chamber is of a larger second volume and said front opening is of a larger second size, means for selectively moving said first oven portion and said second oven portion relative to one another to said first position and to said second position, means to retain said first oven portion and said second oven portion in said first position and said second position, a door carried by said structure pivotable about a door axis to a closed position to cover said opening in said first position and said second position and pivotable to an open position to allow access to said cooking chamber in said first position and said second position, lever means affixed to said door, first engagement means carried by said lever means, and second engagement means carried by said food support rack, said first engagement means adapted to engage said second engagement means and to pull at least a portion of said rack through said front opening as said door is opened.

19. The oven of claim 18 wherein said means for moving said food support rack comprises a first lever arm having a proximate end pivotally affixed to said door and having a distal end affixed to a second lever arm, a slide member carried by said second lever arm, a wall carried by said first oven portion forming a groove generally transverse to the direction of movement of said first oven portion and said second oven portion relative to one another, said groove adapted to receive said slide member in slidable engagement therewith, said first engagement means comprises a leg carried by said second lever arm, said second engagement means comprises a step on said food support rack, said leg adapted to engage said step when said door is opened.

20. The oven of claim 19 wherein said lever means carries an abutment and said structure carries latch means biased to a first position in which said latch means engages said abutment when said door is in said closed position to removably secure said door in said position, and means to move said latch means to a second position to unsecure said door to allow said door to pivot to its open position.

* * * * *